US006446864B1

(12) United States Patent
Kim et al.

(10) Patent No.: US 6,446,864 B1
(45) Date of Patent: Sep. 10, 2002

(54) SYSTEM AND METHOD FOR MANAGING GAMING TABLES IN A GAMING FACILITY

(75) Inventors: Jung Ryeol Kim, Mokdong Shinsigaji Apt. 703-1301, 925, Mok-Dong, Yangcheon-Gu, Seoul (KR); Dae Hyung Lee, Seoul (KR); Dong Sik Kim, Kwanack Hyundai Apt. 120-806, 1001, Bongcheon 3-Dong, Kwanack-Gu, Seoul (KR); Dong Heon Han, Los Angeles, CA (US)

(73) Assignees: Jung Ryeol Kim, Seoul (KR); Dong Sik Kim, Seoul (KR)

( * ) Notice: Subject to any disclaimer, the term of this patent is extended or adjusted under 35 U.S.C. 154(b) by 0 days.

(21) Appl. No.: 09/495,368

(22) Filed: Feb. 1, 2000

(30) Foreign Application Priority Data

Jan. 29, 1999 (KR) ............................................ 99-2858

(51) Int. Cl.[7] ................................................ G06K 5/00

(52) U.S. Cl. ....................... 235/382; 235/375; 235/380; 463/25; 463/29; 463/39; 463/42; 463/46

(58) Field of Search ............................. 463/39, 25, 29, 463/46, 42; 235/382, 380, 375

(56) References Cited

U.S. PATENT DOCUMENTS 3,968,582 A * 7/1976 Jones ......................... 40/27.5
4,755,941 A * 7/1988 Bacchi ....................... 364/412
5,586,936 A * 12/1996 Bennett et al. ............... 463/25
5,613,912 A * 3/1997 Slater .......................... 463/25
5,735,742 A * 4/1998 French ........................ 463/25
5,809,482 A * 9/1998 Strisower ..................... 705/30
5,919,090 A * 7/1999 Mothwurf .................... 463/25
5,952,640 A * 9/1999 Lucero ....................... 235/380
5,957,776 A * 9/1999 Hoehne ....................... 463/25
6,165,069 A * 12/2000 Sines et al. ................... 463/12

* cited by examiner

*Primary Examiner*—Michael G. Lee
*Assistant Examiner*—Seung Ho Lee
(74) *Attorney, Agent, or Firm*—Katten Muchin Zavis Rosenman

(57) ABSTRACT

Disclosed is a gaming table managing system and method thereof for determining the performance of dealers and also estimating the revenue for each gaming table. The system employs a wireless communications network and includes: an identification card; a table module having a plurality of service call buttons, a chip sensing mechanism and a card reader, for generating service call data, dealer-associated data and chip-associated data; a host computer for receiving the dealer-associated data and the chip-associated data and determining the performance of the dealer and estimating the revenue of the gaming facility, using received data; and a service call processing unit for receiving the service call data and displaying same on a screen.

18 Claims, 9 Drawing Sheets

SYSTEM AND METHOD FOR MANAGING GAMING TABLES IN A GAMING FACILITY

FIELD OF THE INVENTION

The present invention relates to a system and method for managing gaming tables in a gaming facility; and, more particularly, to a system and method which are capable of automatically monitoring dealers working at tables in the gaming facility allowing the performance of each of the dealers to be determined and a revenue of the gaming facility to be estimated.

DESCRIPTION OF THE PRIOR ART

Typically, gaming facilities such as a casino club are using a plurality of gaming tables. In such a gaming table, a dealer is in charge of dealing cards to players positioned at the table and collecting chips therefrom.

Revenue of the club is estimated by the collected chips from the gaming tables. Thus, if the dealer in a table is less efficient in dealing cards or collecting chips than others, the table may yield less revenue. Moreover, there are always cases in which some of the dealers may cheat chips form the table, causing a dent in the total revenue.

One of conventional gaming table managing systems is disclosed in U.S. Pat. No. 5,613,912 issued on Mar. 25, 1997 to Timothy J. Slater, et al., entitled "BET TRACKING SYSTEM FOR GAMING TABLES", which automatically tracks betting activities of casino patrons at gaming tables and provides an indication of these betting activities to casino personnel in real time.

In the conventional bet tracking system, the casino patrons use magnetic cards to check themselves in and out of the bet tracking system through magnetic card readers that are located at each betting position of a gaming table. The magnetic card readers read identity and location codes of each patron and transmit it to a computer system via wireless communications network. By using the codes, the computer system retrieves information associated with the patrons, estimates an average bet for the patron based on the current minimum table bet for the gaming table and the time period of the patron's play, and calculate periodically an average theoretical win based on the patron's play. This information is made available through the casino computer system to the casino personnel at the patron's gaming table and at any other gaming table to which the patrons moves. The information available to the casino personnel is updated periodically to reflect the patron's accumulated betting activity.

Even if the conventional system is capable of managing the patrons by tracking the betting activities of the patrons, it is impossible to monitor the performance of dealers and also accurately check the revenue for each table.

Likewise, there are U.S. Pat. No. 5,809,482 issued to Strisower John M, et al. and U.S. Pat. No. 5,586,936 issued to Bennett Michael J, et al., as methods for tracking players located at each gaming table, which employ a wireless communications network between each table and a host computer. The U.S. Pat. No. 5,809,482 teaches a system including a casino database which stores betting summary records for each of the players and the player's betting rating. In this patent, one or more gaming tables include a plurality of player's positions and a plurality of code readers. The code readers initiates a betting session in response to reading a player identification card encoded with a player identification code. This patent also collects real time data of the player's betting transactions, including the player's identification code and an average bet by the player during the betting session; updates the betting summary record with the collected real time data for the player; and provides the updated betting summary record to the casino database via the communications network. Although this patent may manage the betting records for each players and the player's betting rating information, it suffers from a shortcoming that it is difficult to determine the performance of dealers and also accurately check the revenue for each table.

The U.S. Pat. No. 5,809,482 discloses an automated gaming table tracking system which includes a sensor located at a dealer's side for sensing the start and end of each game; an unique player identity card containing identity information of the player assigned to the player identity card; a plurality of player station controls, one of which is located at each of a plurality of player positions; and a central distribution control connected to each player station control for determining the start and the end of each game and beginning and termination of play by each player at each position. Although this patent may check the start and the end of the game and manage information of the player's betting transactions, it suffers from a drawback that it is difficult to determine the performance of each dealer.

As described earlier, all of the chips collected from all of the gaming tables located in the gaming club may determine the revenue of the gaming club. Various chip-sensing techniques have been introduced to support this.

For example, there is U.S. Pat. No. 4,755,941 issued to Bacchi Lorenzo, entitled "SYSTEM FOR MONITORING THE MOVEMENT OF MONEY AND CHIPS ON A GAMING TABLE", which includes a tray for receiving gaming chips and sensors for sensing the chips held by the tray. In this patent, a cash box is provided for the deposit of cash received in return for chips dispensed from the tray; a keyboard is provided to record each deposit of cash into the cash box; and a central processing unit is responsive to a timer. The keyboard and the sensors record each transaction which takes places on the gaming table into data storage means. A warning light lights up in the event that money, which has been deposited in the cash box, is not entered into the keyboard. However, although this patent may monitor each transaction on the gaming table and somewhat determine the competence of individual dealer, it has a disadvantage that there is a need to provide a plurality of second sensors and the keyboard for each table, which in turn, drives up the cost of the system. Further, since chips inserted into a chip slot provided on the gaming table determine the revenue, it is difficult to accurately estimate the revenue.

There is U.S. Pat. No. 5,735,742 issued to French John, entitled "GAMING TABLE TRACKING SYSTEM AND METHOD", which employs a gaming chip having a transponder embedded therein to report the total value of the chips at any location. However, although, in the invention disclosed in this patent, an inventory of all of the chips may be checked and the revenue of a casino may be estimated, the transponder having a battery must be built into each chip, which renders the structure of the chip highly complicated and increasing the cost thereof.

SUMMARY OF THE INVENTION

It is, therefore, an object of the invention to provide a system for automatically monitoring each dealer located at each gaming table in a gaming facility, allowing simultaneously the performance of each of the dealers and a revenue of the gaming facility to be determined.

It is another object of the invention to provide a system capable of providing various services to individual player located at a gaming table in a gaming facility, through the use of a plurality of call buttons installed on the gaming tables.

It is still another object of the invention to provide a method for automatically monitoring each dealer located at each gaming table in a gaming facility, allowing the performance of each dealer and a revenue of the gaming facility to be simultaneously determined.

In accordance with one aspect of the present invention, there is provided a system for automatically monitoring and tracking dealers located at gaming tables in a gaming facility using a wireless communications network, the system comprising:

a portable data-carrying device;

a table module provided near the dealer on the gaming table, the table module including a plurality of call buttons, a chip sensing mechanism, a reading unit and a signal processing means, for generating service call data, dealer-associated data and chip-associated data, wherein each chip has an unique color representing a denomination thereof;

means connected to the table module via the network, for receiving two types of the data generated from the table module, storing them in a first and second databases, determining the performance of the dealer and estimating a revenue of the gaming facility, based on the stored data; and means connected to the table module via the network, for receiving the remaining type of the data generated from the table module, and displaying same on a screen.

In accordance with another aspect of the present invention, there is provided a method, for use in a gaming table managing system, for automatically monitoring and tracking dealers located at a plurality of gaming tables in a gaming facility, wherein the system includes a portable data carrying device, a table module, a managing means and a call processing unit which are connected with one another in a wireless network communication, the table module including a plurality of call buttons, a chip sensing mechanism, a reading unit and a signal processing means, which comprising the following steps:

(a) detecting a plurality of dealer-associated data, chip-associated data and service call data, using the portable data carrying device and the table module, storing two types of the detected data in a memory, and outputting the remaining type of the data together with the two types of the data, wherein each chip has an unique color representing a denomination of the chip thereof;

(b) receiving the two types of the data, storing each of the two types of the data in a first and second databases, respectively, determining the performance of the dealer and estimating a revenue of the gaming facility, using each data stored in the first and second databases; and (c) receiving the remaining type of the data generated from the table module, and displaying the same on a screen.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
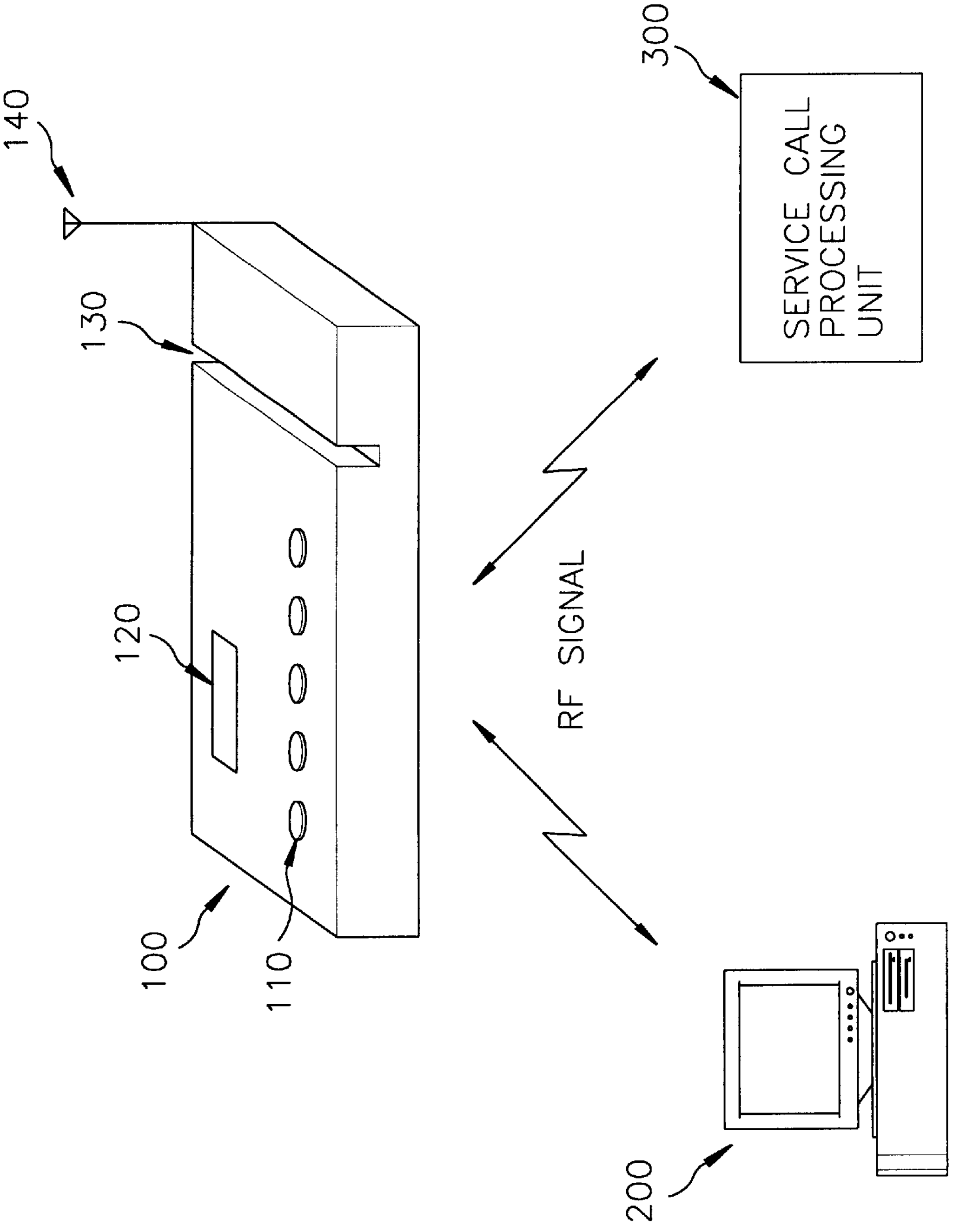
FIG. 1 presents a schematic architecture of a gaming table managing system in accordance with the present invention.

This invention will be described in further detail by way of example with reference to the accompanying drawings. Like reference characters designate like or corresponding parts throughout the description.

Figure 2:
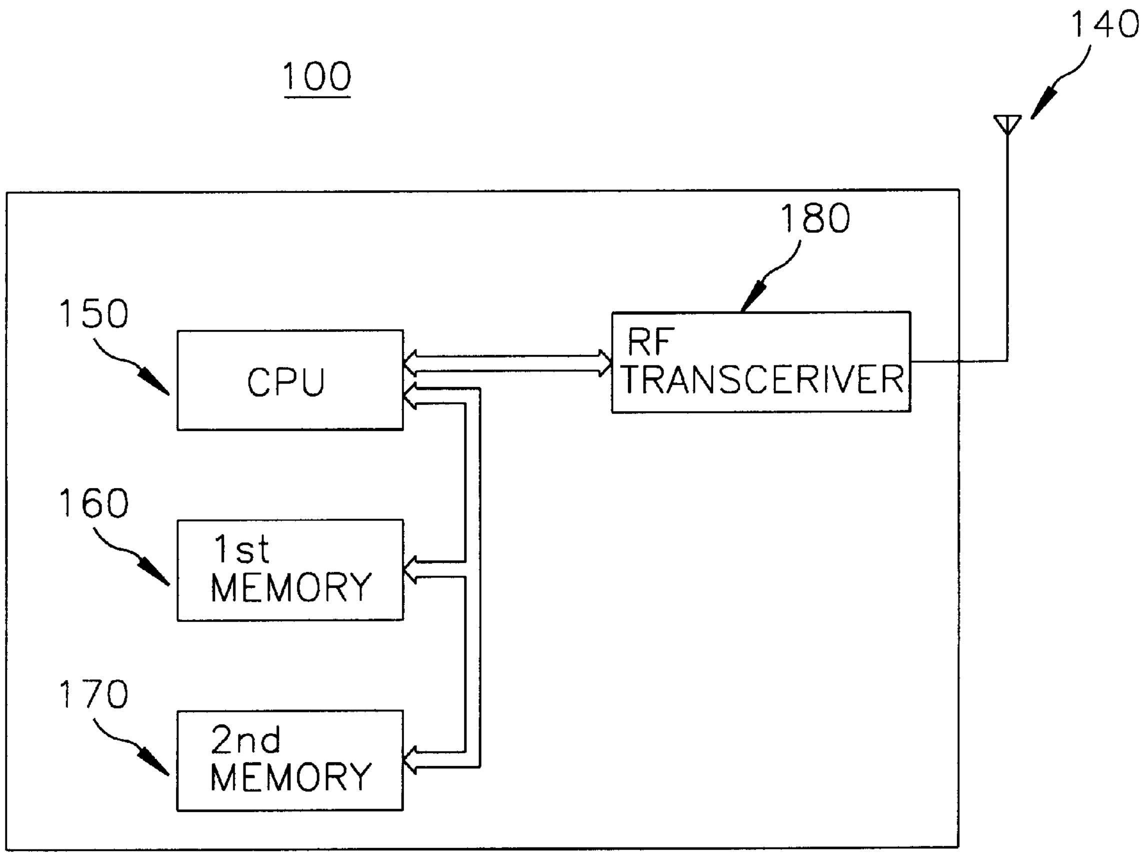
FIG. 2 offers a schematic block of a table module shown in FIG. 1 in accordance with the present invention.

FIG. 1 shows a schematic architecture of a gaming table managing system using a wireless communications network in accordance with a preferred embodiment of the present invention. FIG. 2 offers a schematic block of a table module shown in FIG. 1, which includes a CPU 150, a first memory 160, a second memory 170 and an RF transceiver 180.

As shown in FIG. 1, the gaming table managing system ("GTMS") of the present invention includes a table module 100, a host computer 200 and a service call processing unit 300. The inventive GTMS is capable of accepting up to, e.g., 1024 table modules, using the host computer 200 incorporating GTMS software program therein.

The table module 100 includes a plurality of service call buttons 110, a chip slot 120 and a card reader 130. The call buttons 110 allow players or patrons located at the gaming table to be served, including food and beverage services, chip deliveries, an open seating and so forth. In other words, if there is a request for one of the above services, the dealer simply presses a relevant button among the call buttons 110 on the table module 100 to fulfill the player's request located at the dealer's table. Then, the table module 100 transmits a service call data corresponding to the pressed call button using an RF transceiver 180 and an antenna 140 incorporated therein.

Figure 3:
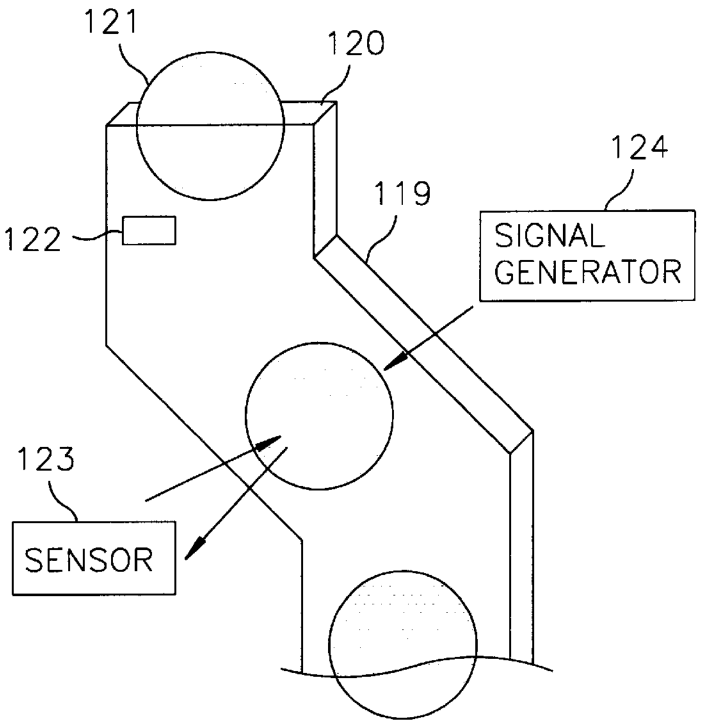
FIG. 3 exemplifies a pictorial representation of a chip sensing mechanism in the table module in accordance with the present invention.

The card reader 130 is provided on the surface of the table module 100, which is used for checking information on whether a dealer takes his or her place on the table or moves away form the table to another table. Specifically, when the dealer inserts his or her identification ("ID") card into the card reader 130 on a gaming table in the gaming facility, the card reader 130 reads out the identification card inserted, detects an ID code of the dealer and transmits the ID code together with a card insertion time to the host computer 200 under the control of the CPU 150 shown in FIG. 2. The ID code and the card insertion time also are stored into the first memory 160. Likewise, after the termination of the game, the dealer again inserts his ID card into the card reader 130 and then moves to another gaming table in the gaming facility. When the ID card is again inserted into the card reader 130 of the table to which the dealer moved, the table module 100 transmits the ID code of the dealer and the card insertion time at which the dealer's card is again inserted into the card reader 130 to the host computer 200, together with chip-associated data previously contained in the first memory 160, which will be described below. The second memory 170 stores therein an operating system program.

shown in FIG. 3, the chip sensing mechanism includes a chute 119, two sensors 122 and 123, and a reference signal generator 124. The chip slot 120 is formed on one end of the chute 119, through which the chip 121 is inserted into the chute 119. The chute 119 is connected with a chip bin provided at the gaming table. The first sensor 122 is attached at the entrance of the chute 119, and senses the drop of the chip 121 and transmits a chip drop signal to the CPU 150, the CPU 150 then transmitting the chip drop signal to the reference signal generator 124. In response to a control signal issued from the CPU 150 based on the chip drop signal, the reference signal generator 124 attached to the chute 119 generates a reference signal to the second sensor 123. Thereafter, in response to the reference signal, the second sensor 123 provided in a facing relationship with the reference signal generator 124, senses the number and denominations of the dropped chips 121, and transmits same to the CPU 150. As described above, since the second sensor 123 and the reference signal generator 124 operate in response to the chip drop signal issued from the first sensor, the present invention requires low power consumption.

In accordance with a preferred embodiment of the present invention, each of the chips may be distinguished by different color formed on its center per denomination.

Figure 4:
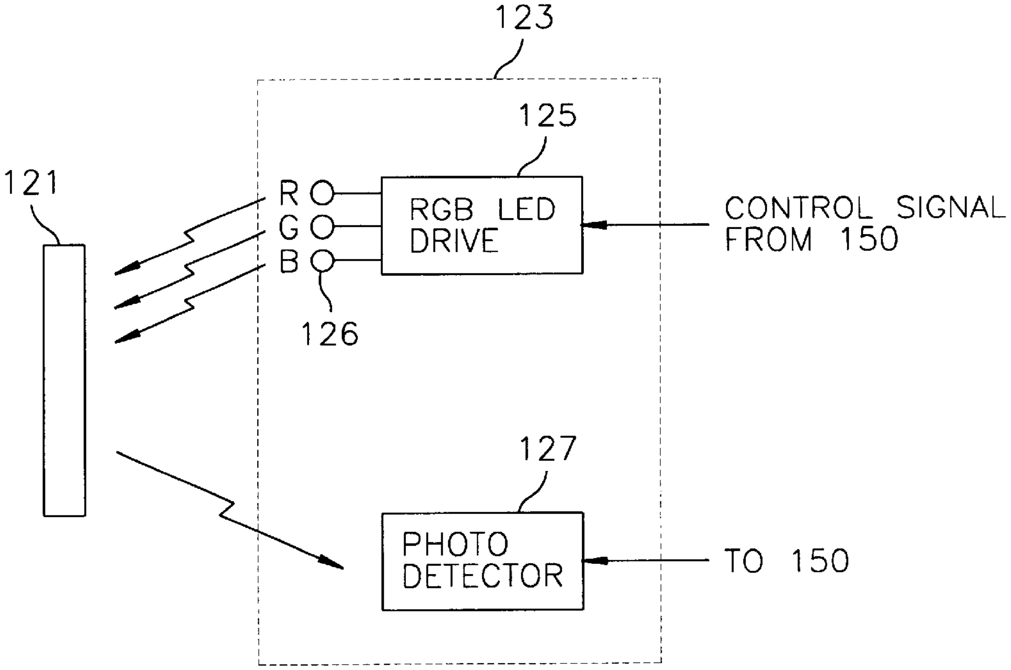
FIG. 4 designates a pictorial representation illustrating a chip sensing technique using the chip sensing mechanism in accordance with the present invention.

FIG. 4 provides a pictorial representation illustrating a chip sensing technique using the second sensor 123 in accordance with the present invention, which includes an RGB light emitting diode (LED) drive 125, a group of LEDs 125 and a photo detector 127. As described above, the second sensor 123 continuously receives the reference signal from the reference signal generator 124, and in the absence of the reference signal, it sequentially drives each LED in the group of LEDs 125.

Specifically, when the chip 121 dropped into the chip slot 120 passes through a lighting area near the second sensor 123, the RGB LED drive 125, in response to the control signal from the CPU 150, sequentially drives each LED 126 to emit a respective light. Then, the chip 121 will reflect any one of Red, Green and Blue lights as shown in FIG. 4.

Next, the photo detector 127 in the second sensor 123 detects reflected light from the chip 121 and outputs the detected light data to the CPU 150.

Thereafter, the CPU 150 determines a chip's denomination corresponding to the light data using a lookup table prestored therein and stores data of the chip's denomination in the first memory 160. The second sensor 123 also checks the number of chips dropped and sends the number to the CPU 150. The CPU 150 stores the number and the denomination data as the chip-associated data in the first memory 160.

The above operation is performed until the dealer moves to another table, i.e., when the ID card of the dealer is again inserted into the card reader 130 which will be described later in more detail.

Figure 5:
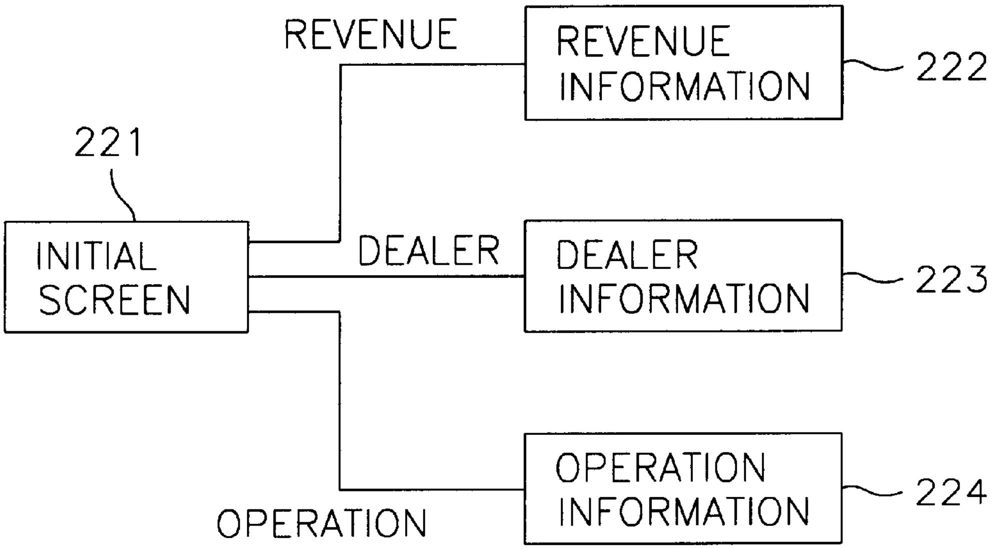
FIG. 5 depicts a block diagram illustrating a menu provided on a screen of a host computer.
Figure 6:
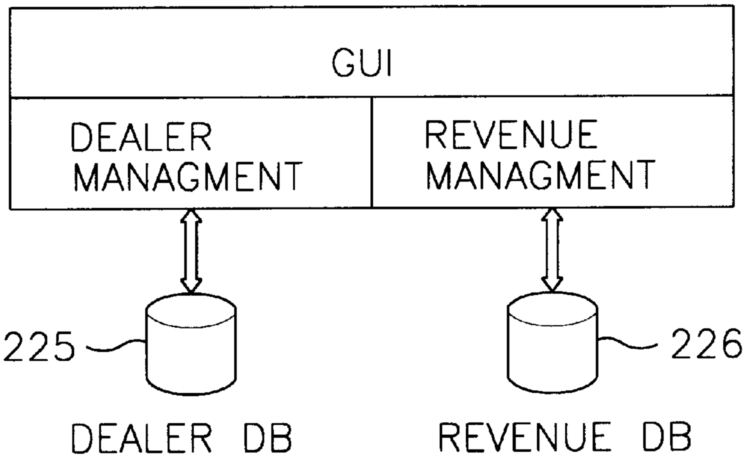
FIG. 6 provides a pictorial representation of a software architecture built into the host computer.

FIGS. 5 and 6 depict a block diagram illustrating a menu provided at a screen of the host computer 200 and a pictorial representation of a software architecture built into the host computer 200, respectively.

In accordance with the present invention, the host computer 200 enables a manager to determine the performance of each dealer and accurately estimate the revenue for each gaming table. As shown in FIG. 5, the host computer 200 of the present invention provides various information including, e.g., revenue information 222, dealer information 223 and operation information 224. The revenue information 222 represents a revenue list for each gaming table by time and day. The dealer information 223 represents a hand count by hour and an average gaming time for each dealer. The operation information 224 represents an operation time for each dealer during a given period.

Specifically, when the manager selects a desired item among the revenue information 222, the dealer information 223 and the operation information 224 on an initial screen 221 by a data entry device, then information associated with the selected item is displayed on the initial screen 221. Subsequently, if a further desired information if desired, the manager may select items linked to the information on the menu on the initial screen 221. It should be mentioned that, in the host computer 200, since each information relevant to dealers or revenue is linked to each other, the manager can see desired information, by month, day, time, table and so forth, if desired. The host computer 200 has a software program for managing a graphic user interface (GUI) and two databases 225 and 226 shown in FIG. 6. The host computer 200 receives each type of information transmitted from the table module 100 via the network, updates corresponding information previously stored in each of the databases 225 and 226 with the newly received information.

Figure 7:
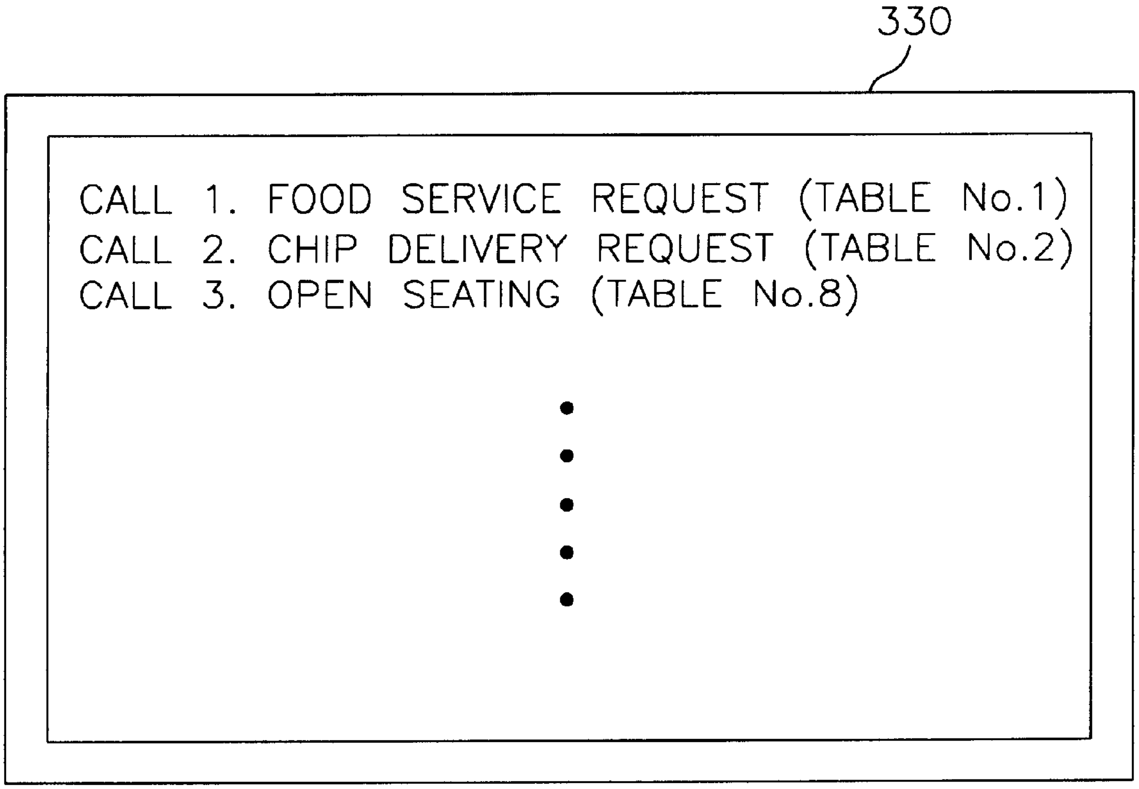
FIG. 7 is a pictorial representation of a service call processing unit having a screen on which various call messages are displayed.

In accordance with the present invention, the service call-processing unit 300 is used to handle service requests of the dealers or the players. The host computer 200 includes an RF transceiver (not shown), which is substantially same as that of the table module 100 and a display 330 as shown in FIG. 7.

Specifically, the service call processing unit 300 receives the service call data transmitted from the table module 100 via the wireless network, converts the service call data into a signal corresponding to a message on a screen of the display 330 to be displayed thereon, allowing it to be seen by service peoples. In this case, transmitted to the service call-processing unit 300 is a corresponding table number as well as the service call data, as shown in FIG. 7. For example, if a dealer or a player located at table No.1 request a food service, the dealer presses a corresponding button on the table module 100. Then, as described above, the table module 100 converts an electric signal corresponding to the pressed button into an RF signal and transmits it to the service call-processing unit 300. Then, the service call processing unit 300 receives the RF signal provided from the table module 100 and displays a message corresponding to the RF signal on the screen thereof. That is, the message is displayed as "Food service request (Table No.1)" on the screen, and the service people provides the requested service to the dealer or the player.

In the present invention, the communication between the table module 100 and the host computer 200 or the service call-processing unit 300 is performed by using a half-duplex communication.

Figure 8A:
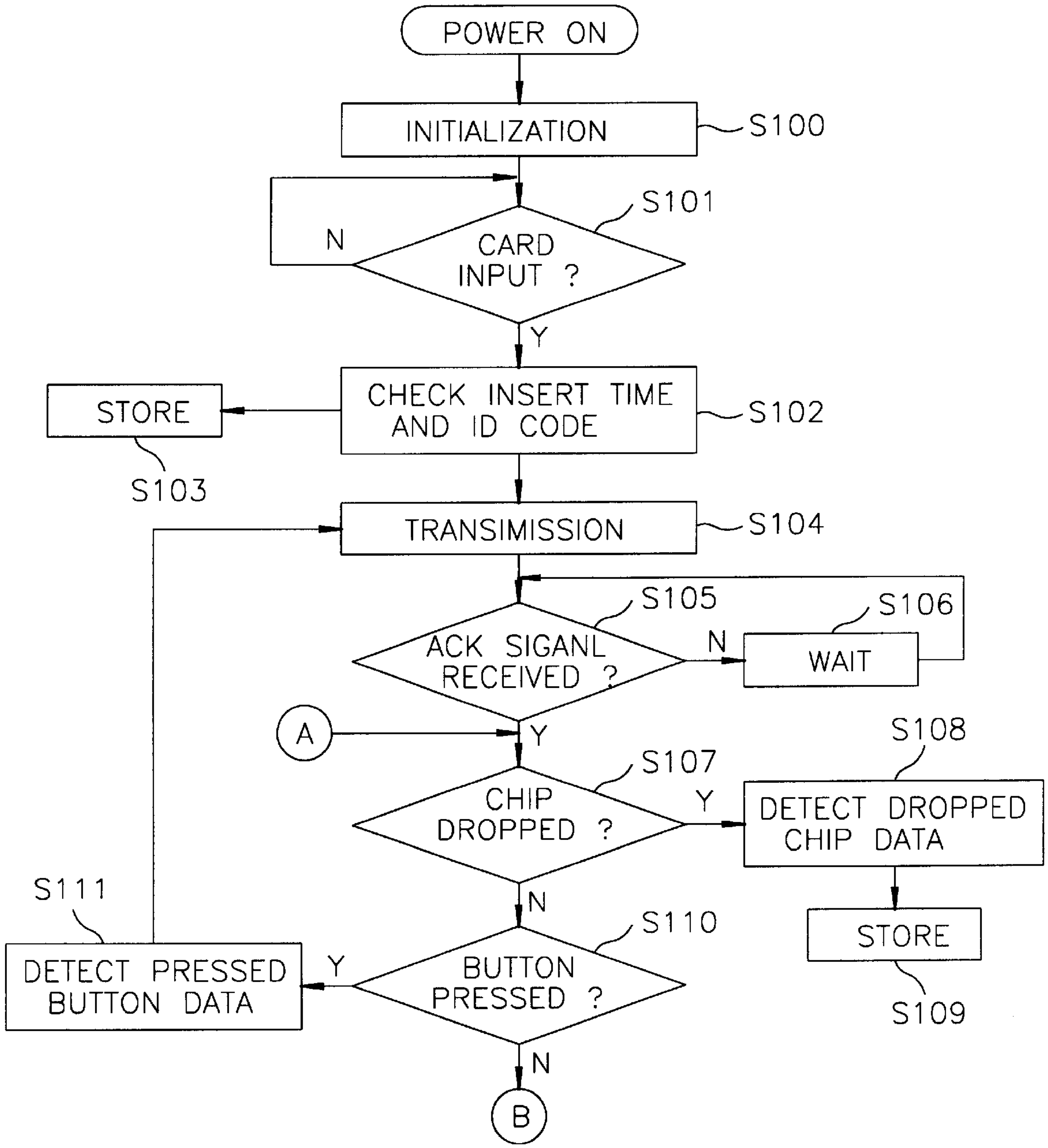
FIGS. 8A and 8B show flow charts, which will be used to describe how the table module operates in accordance with the present invention, respectively.

A detailed description will be made as to the operation of the table module 100 with reference to FIGS. 1 to 4 and FIGS. 8A and 8B, which are flowcharts illustrating how the table module 100 operates in accordance with a preferred embodiment of the present invention. As shown in FIG. 8A, when the table module 100 is powered on, it is initialized at step S100. At step S101, the CPU 150 in the table module 100 checks whether or not the ID card of the dealer has been inserted into the card reader 130 thereon. When the ID card is inserted into the card reader 130, the process proceeds to step S102, wherein the CPU 150 checks time at which the card was inserted into the card reader 130 and the ID code of the dealer. The card insertion time and the dealer's ID code checked at step S102 are stored in the first memory 160 shown in FIG. 2. At the same time, at step S104 the CPU 150 transmits the card insertion time and the ID code to the host computer 200 using the RF transceiver 180 and the antenna 140 via the wireless communications network.

Thereafter, a decision is made at step S105 to determine whether or not an acknowledge signal "ACK" transmitted from the host computer 200 is received by the table module 100, the ACK signal informing that the card insertion time and the ID code provided from the table module 100 are received by the host computer 200. At step S105, if there is no ACK signal, the process proceeds to step S106, wherein the table module 100 waits for a prescribed interval and again transmits the card insertion time and the dealer's ID code to the host computer 200.

Figure 8B:
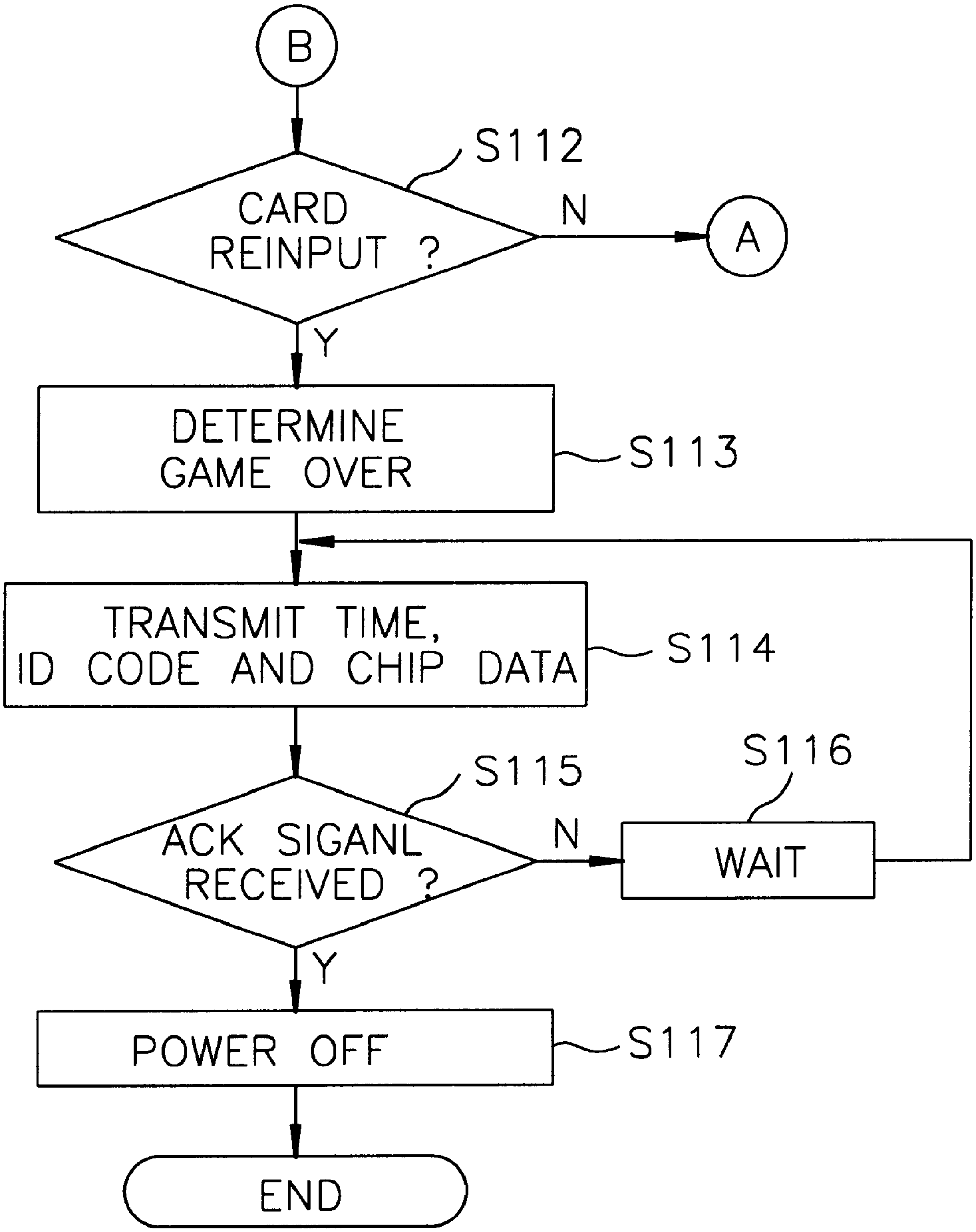

On the other hand, if the ACK signal is received at step S105, the process proceeds to step S107, wherein the table module 100 checks whether or not chips are dropped into the chip slot 120. If so, at step S108 the table module 100 detects the number and denominations of the dropped chips using the chip sensing mechanism, and stores same in the first memory 160 at step S109. If, at step S107, the checked result is negative, the process proceeds to step S110, wherein the table module 100 checks whether or not any one of service call buttons 110 mounted on the table module 100 has been pressed. If so, at step S111 the table module 100 detects a value of the pressed call button and transmits the detected value as the service call data. If otherwise, the process returns to step S107 via Tap B, wherein the process of FIG. 8B is fulfilled. Referring now to FIG. 8B, at step S112, the table module 100 checks whether the ID card of the dealer is again inserted into the card reader 130. In this conditional branch step, if the checked result is negative, then the process returns to step S107 via Tap A, wherein the procedures described above are iteratively performed. However, if the checked result is positive, then the process proceeds to step S113, wherein the table module 100 determines that the play in the corresponding gaming table is over.

After that, the table module 100 transmits the data stored in the first memory 160 at steps 103 and 109, i.e., the card insertion time, the dealer's ID code and the chip-associated data to the host computer 200 and the process proceeds to step S115. As stated above, a decision is made at step S115 to check whether or not the ACK signal from the host computer 200 is received by the table module 100, and if so, at step S117, the power of the table module 100 is turned off and the process ends. On the other hand, if there is no ACK signal, then the process waits for a prescribed interval and repeatedly transmits the data till the ACK signal is received.

Figure 9:
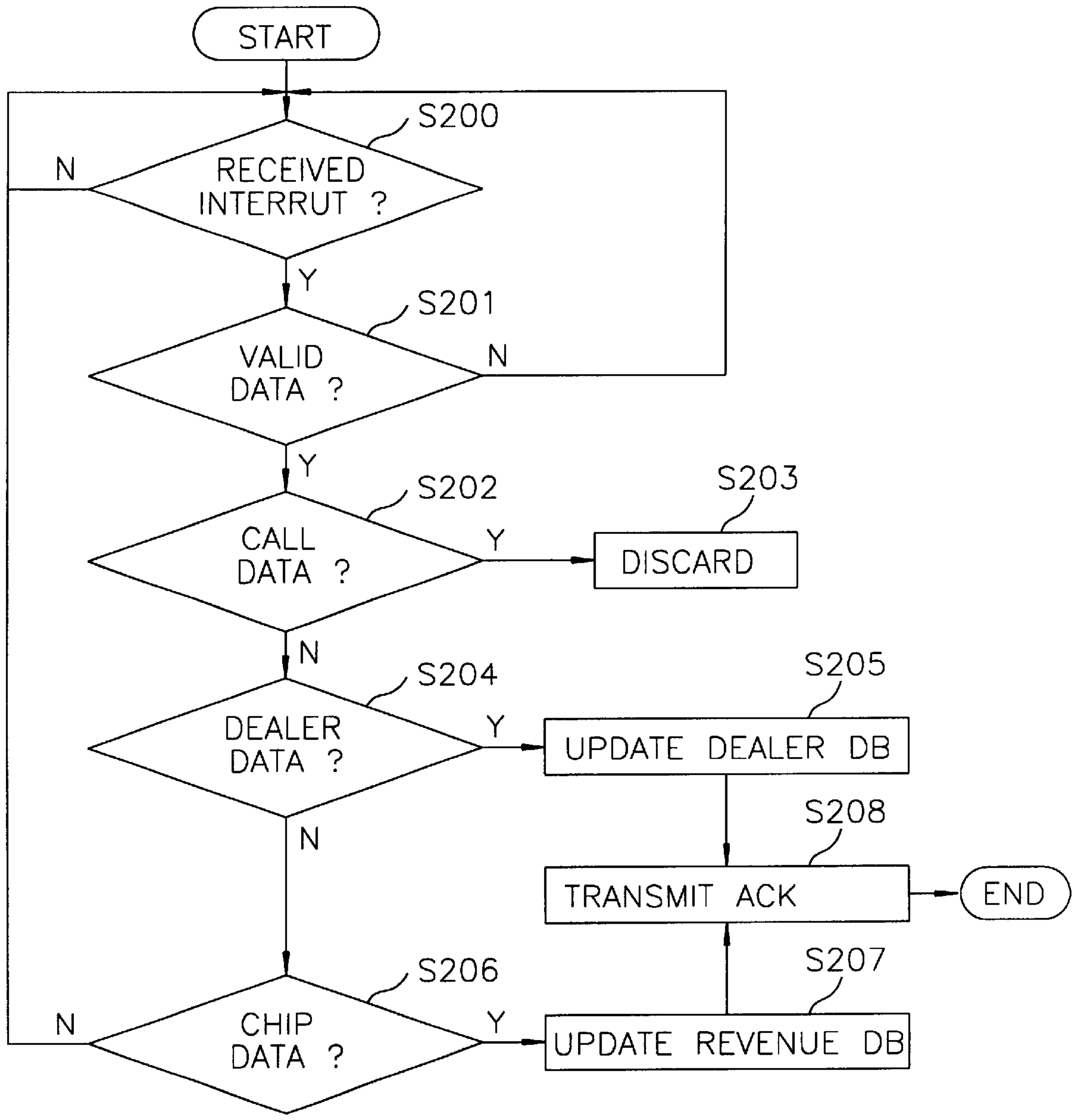
FIG. 9 denotes a flow chart which will be used to describe how the host computer operates in accordance with the present invention.

Referring now to FIG. 9, there is a flow chart which will be used to describe how the host computer 200 operates in accordance with the present invention.

At step S200, the host computer 200 determines whether or not a receive interrupt signal is generated from an RF transceiver (not shown) incorporated therein, which is substantially same as that of the table module 100. If the receive interrupt signal is generated, the process proceeds to step S201, wherein a decision is made to determine whether or not a received data from the table module 100 is valid.

At step S201, if it is determined that the received data is valid based on a header or a checksum code contained in the received data, the process goes to step S202, wherein the host computer 200 determines whether or not the received data is the service call data, and if so, at step S203 the host computer 200 discards the service call data. On the other hand, if it is determined that the received data is not valid, the process discards the same and returns to step S200. If it is determined that the received data is not the service call data at step S202, at step S204 the host computer 200 determines whether or not the received data is the dealer-associated data, and if so, the process goes to step S205, wherein the host computer 200 updates the dealer-associated data previously stored in the dealer database 225 shown in FIG. 6 with the newly received dealer-associated data. At step S208, the host computer 200 transmits the Ack signal to the table module 100, the Ack signal informing the table module 100 of the receipt of the dealer-associated data.

At step S204, if it is determined that the received data is not the dealer-associated data, the process proceeds to step S206, wherein the host computer 200 determines whether or not the received data is the chip-associated data, and if so, the process goes to step S207, wherein the host computer 200 updates chip-associated data previously stored in the revenue database 226 shown in FIG. 6 with the newly received chip-associated data. Similarly, at step S208, the host computer 200 transmits the Ack signal to the table module 100. At step S206, if it is determined that the received data is not the chip-associated data, the process returns to step S200, wherein the above procedure is iteratively repeated.

Figure 10:
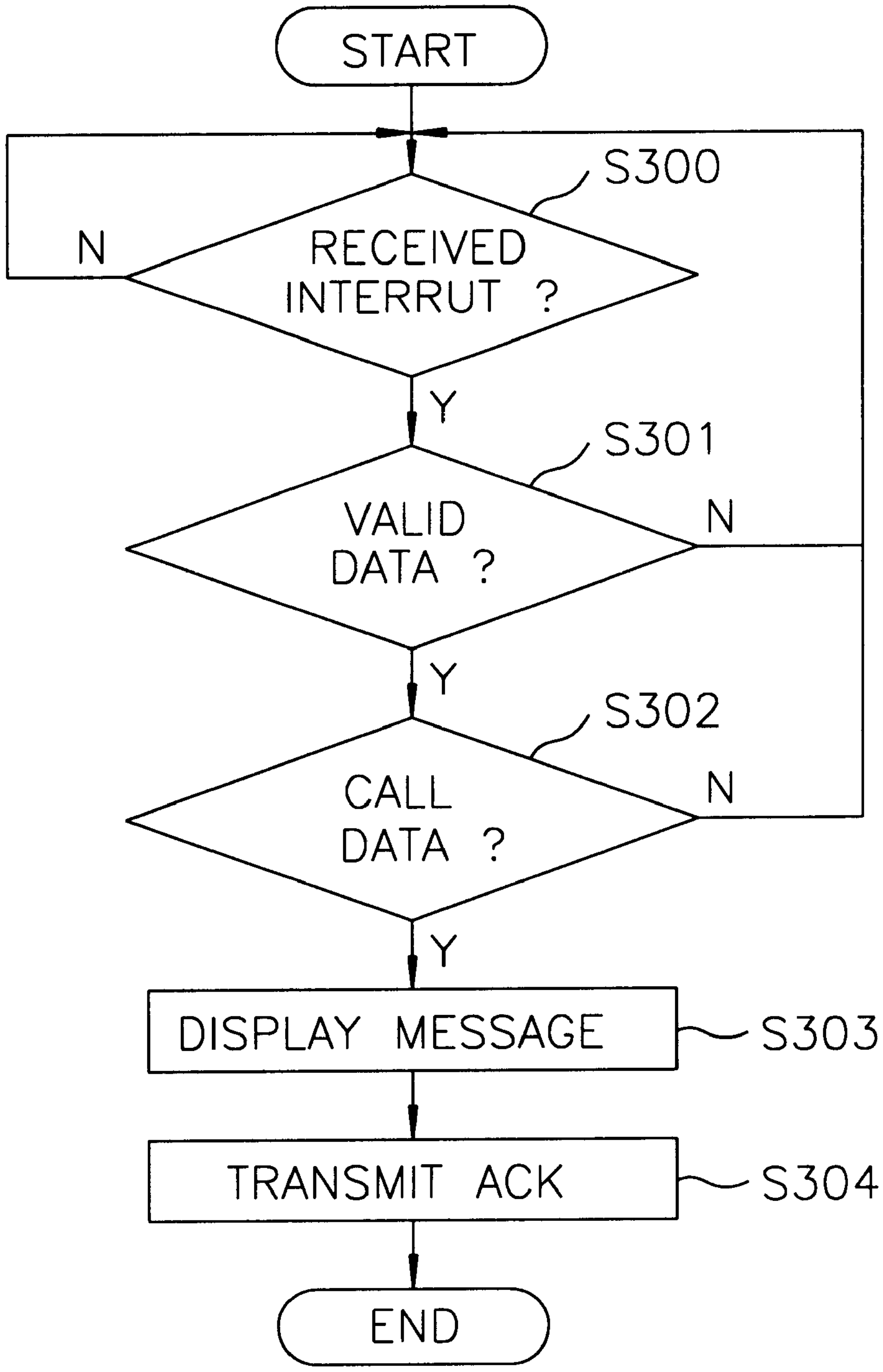
FIG. 10 shows a flow chart, which will be used to describe how the service call processing unit operates in accordance with the present invention.

FIG. 10 shows a flow chart, which will be used to describe how the service call processing unit 300 operates in accordance with the present invention.

At step S300, the service call processing unit 300 determines whether or not a receive interrupt is generated from an RF transceiver (not shown) incorporated therein, which is substantially same as that of the table module 100. If the receive interrupt signal is generated at step S300, the process proceeds to step S301, wherein a decision is made to determine whether or not a received data from the table module 100 is valid.

At step S301, if it is determined that the received data is valid based on the header or the checksum code, the process goes to step S302. At step S302, the call-processing unit 300 determines whether or not the received data is the service call data, and if so, at step S303 the call processing unit 300 displays a message corresponding to the service call data on the display 330 shown in FIG. 7.

On the other hand, at step S301 if it is determined that the received data is not valid, the processing unit 300 discards the same and returns to step S300. Similarly, at step S302 if it is determined that the received data is not the service call data, the call processing unit 300 discards the same and returns to step S300.

As previously mentioned, the present invention installs the chip sensing mechanism at each gaming table to automatically detect denominations of each dropped chip and the number thereof to thereby allow the revenue for each gaming table in a gaming facility to be effectively estimated, which in turn, allows the performance of each dealer to be accurately determined. Furthermore, by mounting a plurality of service call buttons on the table module, the present invention has the capacity to easily provide various services to the players seated at each gaming table.

While the present invention has been described with reference to the particular embodiments, it will be apparent to those skilled in the art that various changes and modifications may be made without departing from the spirit and scope of the invention as defined in the following claims.

What is claimed is:

1. A system for automatically monitoring and tracking dealers located at gaming tables in a gaming facility using a wireless communications network, the system comprising:

a portable data-carrying device;

a table module provided near the dealer on the gaming table, the table module including a plurality of call buttons, a chip sensing mechanism, a reading unit and a signal processing means, for generating service call data, dealer-associated data and chip-associated data, wherein each chip has an unique color representing a denomination thereof;

means connected to the table module via the network, for receiving two types of the data generated from the table module, storing them in a first and second databases, determining the performance of the dealer and estimating a revenue of the gaming facility, based on the stored data; and means connected to the table module via the network, for receiving the remaining type of the data generated from the table module, and displaying same on a screen.

2. The system according to claim 1, wherein the reading means reads out an identification code of the dealer contained in the portable data carrying device; and the signal processing means processes the service call data, the dealer-associated data and the chip-associated data, stores them in a memory and transmits the same via the network.

3. The system according to claim 2, wherein the chip sensing mechanism includes:

a passage member along which the chip slide toward a chip bin provided at the gaming table;

an opening formed on one end of the passage member, through which the chip is inserted into the passage member;

a first sensing means attached to an entrance of the passage member, for sensing the chip drop and transmitting a chip drop signal to the signal processing means;

means attached to the passage member, for generating a reference signal, in response to a control signal issued from the signal processing means based on the chip drop signal; and a second sensing means provided in a facing relationship with the reference signal generating means, for sensing the number and denomination of the dropped chips based on the control signal, and transmitting same as the chip-associated data to the signal processing means.

4. The system according to claim 3, wherein the second sensing means includes:

a plurality of light emitting means, each of which has an unique color;

means for sequentially driving the plurality of light emitting means in response to the control signal issued from the signal processing means, and allowing each of the plurality of light emitting means to emit a light beam corresponding to the unique color toward the chip to be reflected therefrom; and means for detecting the reflected light beam from the chip and outputting detected light beam data to the signal processing means.

5. The system according to claim 2, wherein the reading means includes a groove along/into which the portable data carrying device is slid/inserted, the reading means reads out the identification code of the dealer when the portable data carrying device is slid/inserted along/into the groove, and outputs the identification code as the dealer-associated data to the signal processing means which stores in the memory the identification code and the device insertion time.

6. The system according to claim 1, wherein the managing means includes:

means for determining whether or not data received from the table module is the two types of the data; if so, storing the same in the first and second databases, respectively, and if otherwise, discarding the same;

means for transmitting an acknowledge signal to the table module, the acknowledge signal informing the table module of the receipt of the two types of the data;

means for displaying the two types of the data on a screen;

means for selecting a desired item among information on the screen; and means for updating the two types of the data previously stored in the first and second databases with the two types of the data newly received.

7. The system according to claim 1, wherein the displaying means includes:

means for determining whether data received from the table module is the remaining type of the data; if so, processing the same to allow it to be displayed on the screen; and if otherwise, discarding the same;

means for transmitting an acknowledge signal to the table module, the acknowledge signal informing the table module of receipt of the remaining type of the data; and means for reducing the displayed data on the screen.

8. The method according to claim 1, wherein the two types of the data are the dealer-associated data and the chip-associated data, and the remaining type of the data is the service call data including any of food services, chip deliveries, open seats and callings.

9. The system according to claim 8, wherein the portable data-carrying device is a magnetic card and the reading unit is a magnetic card reader.

10. The system according to claim 9, wherein the color of the chip is one of red, green and blue, and colored at the center of the chip.

11. A method, for use in a gaming table managing system, for automatically monitoring and tracking dealers located at a plurality of gaming tables in a gaming facility, wherein the system includes a portable data carrying device, a table module, a managing means and a call processing unit which are connected with one another in a wireless network communication, the table module including a plurality of call buttons, a chip sensing mechanism, a reading unit and a signal processing means, which comprising the following steps:

(a) detecting a plurality of dealer-associated data, chip-associated data and service call data, using the portable data carrying device and the table module, storing two types of the detected data in a memory, and outputting the remaining type of the data together with the two types of the data, wherein each chip has an unique color representing a denomination of the chip thereof;

(b) receiving the two types of the data, storing each of the two types of the data in a first and second databases, respectively, determining the performance of the dealer and estimating a revenue of the gaming facility, using each data stored in the first and second databases; and (c) receiving the remaining type of the data generated from the table module, and displaying the same on a screen.

12. The method according to claim 11, wherein the step (a) includes the following steps of:

(a1) checking whether or not the portable data-carrying device is slid/inserted along/into the reading unit;

(a2) checking, if the portable data carrying device is slid/inserted, a device insertion time and an identification code contained in the device, outputting the checked time and code as the dealer-associated data and storing the same in the memory;

(a3) checking whether or not a chip is dropped into a chip slot provided on the chip sensing mechanism;

(a4) detecting, if the chip is dropped, the number of the dropped chip and the denomination of each dropped chip, outputting the detected value as the chip-associated data, and storing it in the memory;

(a5) checking, if there is no the dropped chip, whether any one of the call buttons mounted on the table module is pressed, detecting a value of the pressed call button, if there is a pressed call button, and outputting the detected value as the service call data; and (a6) checking whether the device is again slid/inserted along/into the reading unit, and iteratively performing the steps (a3) to (a5), if the device is not slid/inserted.

13. The method according to claim 12, comprising after step (a2) the steps of:

(a21) determine whether or not an acknowledge signal is received by the table module, the acknowledge signal informing the table module of the receipt of the device insertion time and the identification code; and (a22) waiting, if there is no the acknowledge signal, for a prescribed interval and again outputting the device insertion time and the identification code.

14. The method according to claim 13, comprising after step (a6), the steps of:

(a61) determining, if the device is again slid/inserted along/into the reading unit, that the play of corresponding gaming table is over;

(a62) outputting all of the data stored in the memory at steps (a2) and (a4);

(a63) determining whether or not the acknowledge signal is received by the table module;

(a64) waiting, if there is no the acknowledge signal, for the prescribed interval and again outputting all of the data stored in the memory; and (a65) powering off the table module, if the acknowledge signal is received.

15. The method according to claim 14, wherein the portable data-carrying device is a magnetic card and the reading unit is a magnetic card reader.

16. The method according to claim 14, wherein the two types of the data are the dealer-associated data and the chip-associated data, and the remaining type of the data is the service call data.

17. The method according to claim 11, wherein the step (b) includes the following steps of:

(b1) determining whether or not a receive interrupt signal is generated;

(b2) checking, if the receive interrupt signal is generated, whether a received data is valid;

(b3) determining, if the received data is valid, whether or not the received data is the service call data, and if so, discarding the service call data;

(b4) determining, if the received data is not valid, whether the received data is the dealer-associated data (b5) updating, if the received data is the dealer-associated data, dealer-associated data previously stored in the first database with the dealer-associated data newly received, and transmitting the acknowledge signal to the table module;

(b6) checking, if the received data is not the dealer-associated data, whether the received data is the chip-associated data;

(b7) updating, if the received data is the chip-associated data, chip-associated data previously stored in the second database with the chip-associated data newly received, and transmitting the acknowledge signal to the table module; and (b8) iteratively performing the steps (b1) to (b7), if the received data is not the chip-associated data.

18. The method according to claim 11, wherein the step (c) includes the following steps of:

(c1) determining whether or not a receive interrupt signal is generated;

(c2) checking, if the receive interrupt signal is generated, whether a received data is valid;

(c3) determining, if the received data is valid, whether or not the received data is the service call data, and if otherwise, discarding the same;

(c4) displaying, if the received data is the service call data, a message corresponding to the service call data on the screen; and (c5) transmitting the acknowledge signal to the table module.

* * * * *